United States Patent

Moghadam et al.

[11] Patent Number: 5,917,542
[45] Date of Patent: Jun. 29, 1999

[54] SYSTEM AND METHOD FOR DIGITAL IMAGE CAPTURE AND TRANSMISSION

[75] Inventors: Omid A. Moghadam, Rochester; Allen D. Heberling, Penfield; James D. Allen, Rochester, all of N.Y.

[73] Assignee: Eastman Kodak Company, Rochester, N.Y.

[21] Appl. No.: 08/801,537

[22] Filed: Feb. 18, 1997

[51] Int. Cl.$^6$ .................................................. H04N 5/225
[52] U.S. Cl. ........................................... 348/207; 348/231
[58] Field of Search ..................................... 348/211, 522, 348/187, 192, 193, 207, 233, 231, 67.1, 67.7; 455/226.1, 226.4; 358/906, 909.1; 386/117, 46; 396/311, 57, 106, 108

[56] References Cited

U.S. PATENT DOCUMENTS

| | | | |
|---|---|---|---|
| 4,097,893 | 6/1978 | Camras | 358/906 |
| 4,884,132 | 11/1989 | Morris et al. . | |
| 5,086,345 | 2/1992 | Nakane et al. | 358/906 |
| 5,134,708 | 7/1992 | Marui et al. | 455/67.7 |
| 5,296,884 | 3/1994 | Honda et al. | 369/311 |
| 5,418,565 | 5/1995 | Smith | 348/233 |
| 5,426,511 | 6/1995 | Nagatomo . | |
| 5,446,553 | 8/1995 | Grube . | |
| 5,537,414 | 7/1996 | Takiyasu et al. . | |
| 5,631,701 | 5/1997 | Miyake | 348/222 |
| 5,666,159 | 9/1997 | Parulski et al. | 348/723 |

FOREIGN PATENT DOCUMENTS

| 5167529 | 7/1993 | Japan | 455/67.7 |
|---|---|---|---|

*Primary Examiner*—Wendy Garber
*Assistant Examiner*—Aung S. Moe
*Attorney, Agent, or Firm*—Thomas H. Close

[57] ABSTRACT

A system method for digital image capture and transmission includes an image fulfillment server, having a transceiver for sending and receiving channel assessment signals and receiving a digital image file and a memory for storing the received digital image file. The system also includes a digital camera having an electronic image sensor for sensing an image and producing a digital image; a short term memory for storing digital images produced by the image sensor in digital image files; a transceiver for communicating with and transmitting the digital image files to the image fulfillment server; a signal strength detector for monitoring the registration signal from the fulfillment server and producing a transmit enable signal; a long term memory for storing the digital image files; the transmit enable signal for disabling transmission of the digital image data when the channel assessment signal indicates that successful transmission of the digital image data is not possible; and a timer for transferring the digital image file from the short term memory to the long term memory after a predetermined period of time.

6 Claims, 4 Drawing Sheets

SYSTEM AND METHOD FOR DIGITAL IMAGE CAPTURE AND TRANSMISSION

FIELD OF THE INVENTION

The invention relates generally to the field of electronic photography, and in particular to an electronic camera having a wireless communication link.

BACKGROUND OF THE INVENTION

It is known in the art that digital data can be transmitted to a destination by using a wireless link. It is also known that electronic cameras are capable of capture and transmission of digital images via a wireless link. An example of such a system is shown in U.S. Pat. No. 4,884,132, issued Nov. 28, 1989, to Morris et al. wherein a personal security system includes an electronic camera that is used to capture an image of an assailant. A wireless transmitter associated with the camera transmits the image via a cellular phone network to a storage device connected to the phone network.

In a wireless electronic camera system, once the image is captured it is then transmitted via a wireless communication link to an image fulfillment server for storage and further image processing. The system works well as long as the photographer stays within range of the image fulfillment server. But once the photographer moves out of range of the image fulfillment server, the transmission will be incomplete and that condition is not known to the photographer until he attempts to transmit another image. Once the photographer moves back in range of the image fulfillment server he needs to stop taking photographs, retrieve the image from memory and attempt to re-transmit the whole image. This results in lower productivity due to the loss of time and increased power consumption from the camera batteries. Presently, one of the main limitations in the use of portable electronic cameras is the availability of sufficient power from the batteries. There is a need therefore for improvements that reduce power consumption in portable electronic cameras.

SUMMARY OF THE INVENTION

The present invention is directed to overcoming one or more of the problems set forth above. Briefly summarized, according to one aspect of the present invention, a system for digital image capture and transmission includes an image fulfillment server, having a transceiver for sending and receiving channel assessment signals and receiving a digital image file and a memory for storing the received digital image file. The system also includes a digital camera having an electronic image sensor for sensing an image and producing a digital image; a short term memory for storing digital images produced by the image sensor in digital image files; a transceiver for communicating with and transmitting the digital image files to the image fulfillment server; a signal strength detector for monitoring the registration signal from the fulfillment server and producing a transmit enable signal; a long term memory for storing the digital image files; means responsive to the transmit enable signal for disabling transmission of the digital image data when the channel assessment signal indicates that successful transmission of the digital image data is not possible; and a timer means for transferring the digital image file from the short term memory to the long tern memory after a predetermined period of time.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantages of reduced power consumption by avoiding unsuccessful transmission attempts and re-transmission when transmission of the image data is not possible.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
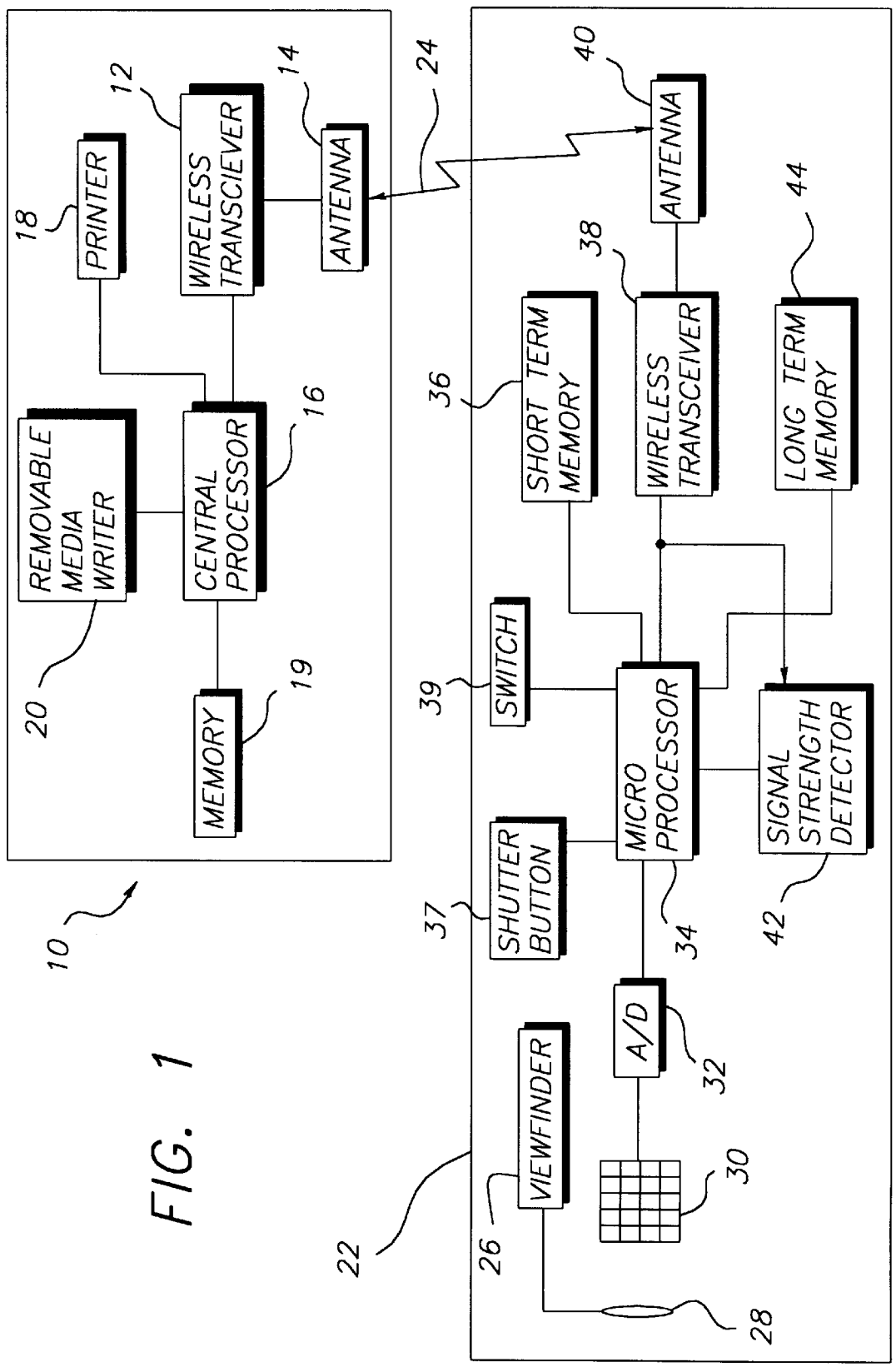
FIG. 1 is a schematic diagram of a digital image capture and transmission system according to the present invention.

Beginning with FIG. 1, a system according to the present invention is shown. The system includes an image fulfillment server 10, having a wireless transceiver 12 with an antenna 14. Wireless transceiver 12 is connected to a central processor 16, such as a personal computer or communications server. A printer 18 for printing digital images is connected to the central processor 16. Memory device 19, such as an EPROM, for short term storage of digital images is connected to the central processor 16. A removable media writer 20 for recording digital images on a removable media such as optical disks or solid state memory modules is also connected to central processor 16. The image fulfillment server 10 communicates with a digital camera 22 over wireless communication link 24. The communication protocol employed by the system is preferably an IEEE 802.11 communications protocol, wherein the transceiver 12 continually emits a channel assessment signal that is used by another remote transceiver to assess the strength and quality of the signal so that a decision can be made as to whether successful communications between the two transceivers is possible.

The digital camera 22 includes a viewfinder 26, and a lens 28 for forming an image of the scene on a solid state image sensor 30. A suitable digital camera for use with the present invention is the DCS 460™ brand digital camera sold by the Eastman Kodak Company, Rochester, N.Y., suitably modified to include the transceiver, signal strength detector, and logic described below. An Analog to Digital converter 32 converts the signal formed by solid state image sensor 30 to a digital image signal. The digital camera 22 is controlled by a micro processor 34 which receives the digital image signal and stores it temporarily in short term memory 36. The digital camera 22 includes a camera power switch 37 for applying power to the camera components and a "shutter release" button 39 that is connected to micro processor 34 to signal the camera to take a picture. A wireless transceiver 38 is connected to micro processor 34 for transmitting a digital image signal through antenna 40 over wireless communications link 24 to image fulfillment server 10, and to receive the channel assessment signal transmitted by transceiver 12 in image fulfillment server 10.

The digital camera 22 includes a signal strength and quality detector 42 that processes the channel assessment signal transmitted by the image fulfillment server 10 and received by wireless transceiver 38. A suitable transceiver and signal strength and quality detector are available on a single chip such as the chip number HSP3824 manufactured by Harris Corporation. The signal strength and quality detector 42 determines if a successful transmission between transceivers 12 and 38 is possible and supplies a signal to the micro processor 34 representing the ability of image fulfillment server 10 to receive transmissions from camera 22. The digital camera 22 also includes a long term memory 44 such as a magnetic disk memory or a rewritable optical disk memory that is connected to microprocessor 34 for longer storage of digital image files.

Figure 2:
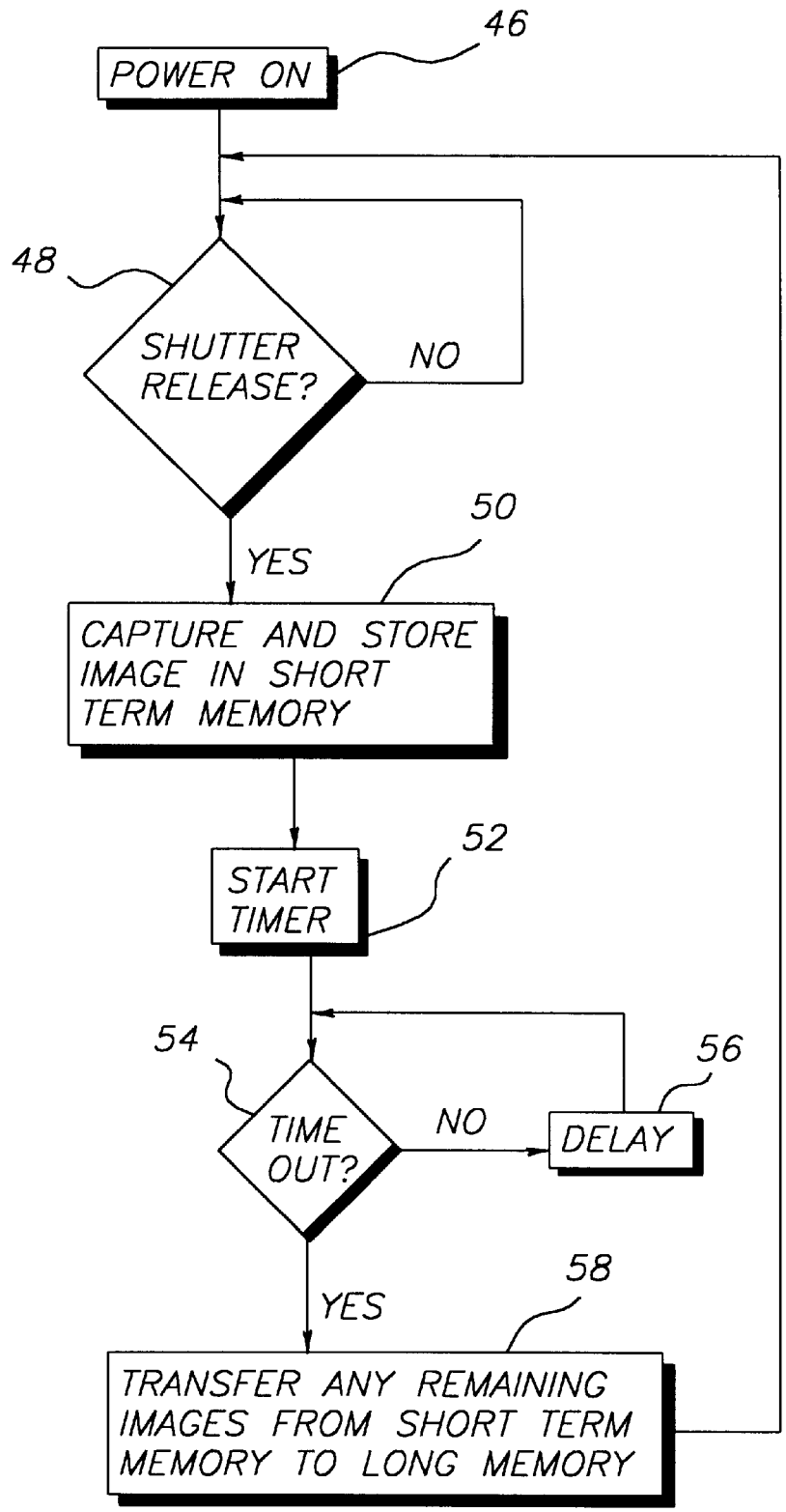
FIG. 2 is a flow chart illustrating the sequence of image capture operations performed by a camera in a system according to the present invention.

Referring now to FIG. 2, the digital image capture portion of the system according to the present invention will be described. After the power is turned on 46 to the camera 22, actuation 48 of the shutter release causes the camera to capture and store 50 a digital image in short term memory 36. The microprocessor 34 starts a timer 52 associated with the image stored in blocks (e.g. 512 bytes each) short term memory 36. The timer 52 has a time period on the order of minutes (e.g. 10 minutes) The microprocessor then periodically checks 54 to determine whether the timer has timed out. If the timer has not timed out, the microprocessor executes a short delay 56 and rechecks the time. When timer 52 times out, any image data remaining in short term memory is transferred 58 to long term memory 44 and the microprocessor waits for the next shutter release 48.

Figure 3:
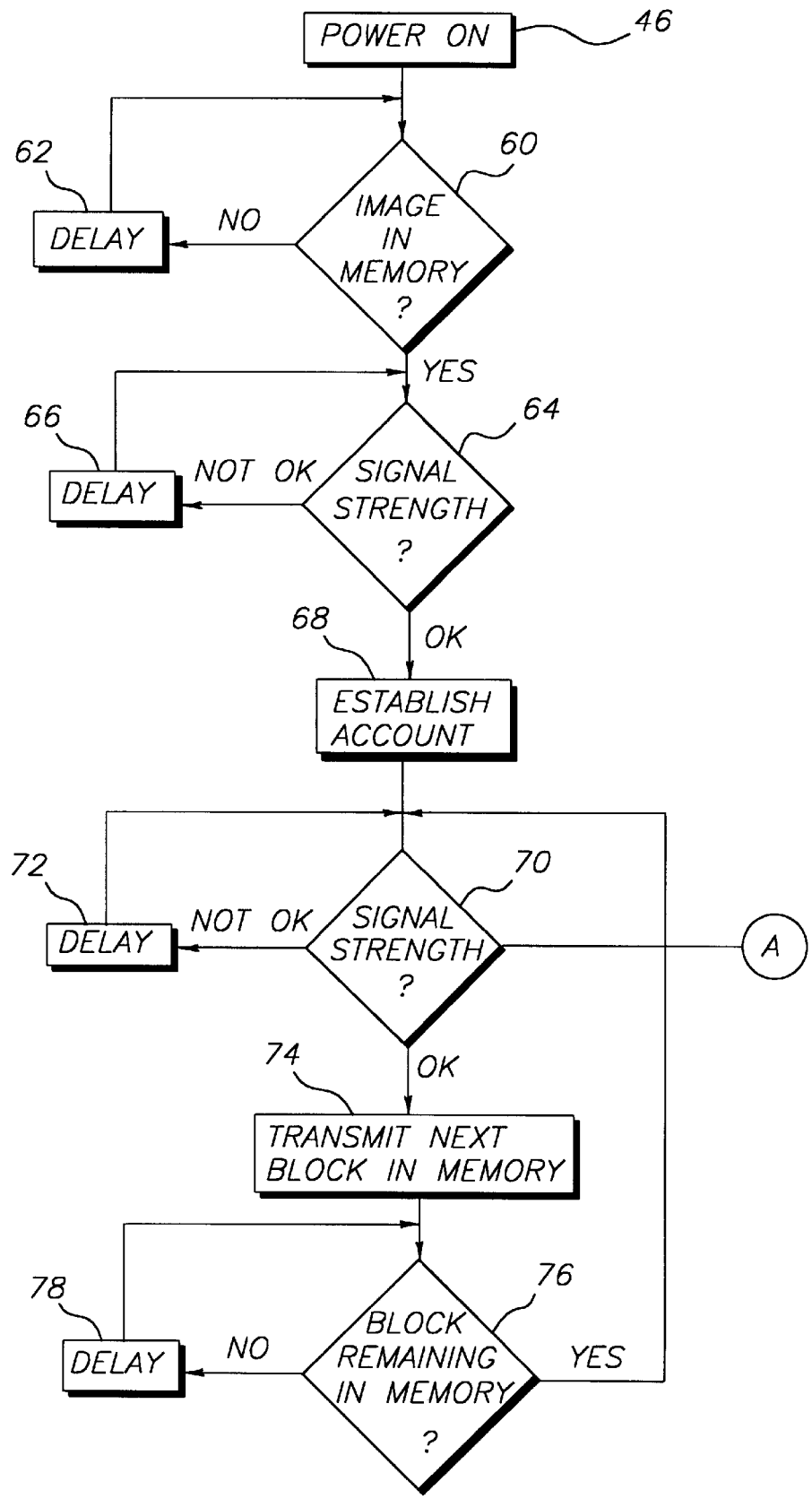
FIG. 3 is a flow chart illustrating the sequence of image transmission operations performed by a camera in a system according to the present invention.

Referring to FIG. 3, the sequence of operations for transmitting an image in either short term or long term memory will be described. When the camera 22 is first turned on 46 by actuating camera power switch 37, a check is made 60 to determine if there is any image data in either short term 36 or long term memory 44. If there is no image data to transmit, a short delay 62 is executed, and the check 60 is made again. If there is some image data to transmit, a check is made 64 to determine if the signal strength and quality as detected by detector 42 is sufficient to insure successful transmission of the data. If the signal strength and quality are insufficient for transmission, a short delay 66 is executed and the check 64 is made again. When the signal strength and quality are sufficient for transmission, the camera 22 transmits a message 68 to establish an account with the image fulfillment server 10. The message may include, for example the serial number of the camera, and date and time of transmission. After the account data is transmitted, the camera 22 again checks to see if the signal strength and quality are sufficient for successful transmission 70. If not, a short delay 72 is executed and the check is made again. When the signal strength detector 42 indicates that successful transmission is possible, the next block in memory is transmitted 74. A check is then made to see if any blocks of image data remain to be transmitted 76. If there are remaining blocks of image data in either memory, the check for signal strength 70 is repeated, and the next block is transmitted. All of the blocks in long term memory 44 are transmitted, first in first out, then any blocks in short term memory are transmitted. When all of the blocks in either of the short term or long term memories have been transmitted, a short delay is executed 78, and the check for the presence of image data in the memory 76 is repeated.

Figure 4:
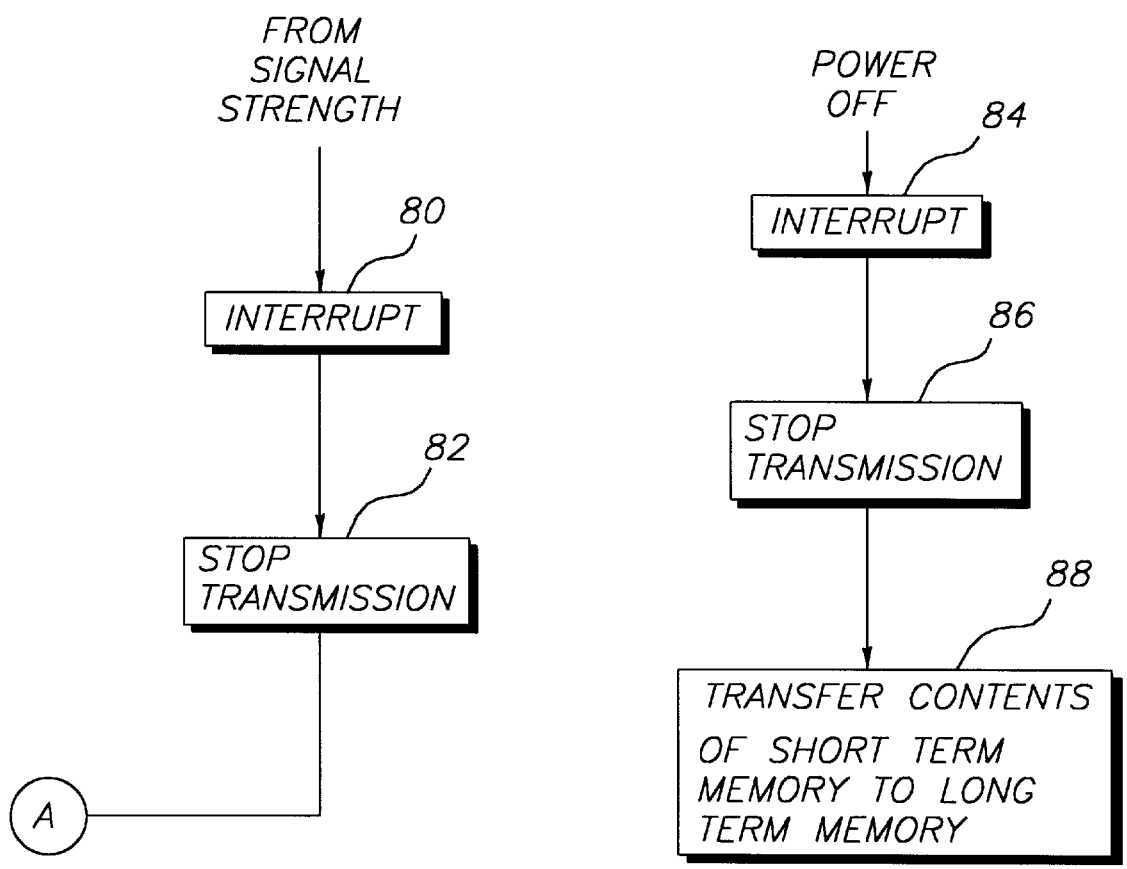
FIG. 4 is a flow chart illustrating interrupt logic associated with the image capture and transmission sequences.

Referring to FIG. 4, if at any time during the image transmission, the signal strength and quality become insufficient for successful transmission, an interrupt 80 is executed and transmission of the current block of data is stopped 82. The sequence of operations then returns to delay 72 in FIG. 3. Similarly, if at any time during the capture or transmission sequences, the power to the camera is turned off, an interrupt 84 is executed, transmission of the image data is stopped 86, and any image data in short term memory 36 is transferred 88 to long term memory 44 prior to removing power from the camera.

The transceiver 44 consumes a relatively large amount of power compared with the rest of the elements in camera 10. The system of the present invention significantly reduces power consumption by not attempting transmission when successful transmission would not be possible. Since the short term memory 36 can be accessed more rapidly than long term memory 44, the system of the present invention also results in more timely transmission of the image data by transmission directly from short term memory when successful transmission is possible.

The invention has been described with reference to a preferred embodiment. However, it will be appreciated that variations and modifications can be effected by a person of ordinary skill in the art without departing from the scope of the invention.

PARTS LIST 10 image fulfillment server
12 wireless transceiver
14 antenna
16 central processor
18 printer
19 memory
20 removable media writer
22 digital camera
24 wireless communication link
26 view finder
28 lens
30 solid state image sensor
32 analog to digital converter
34 micro processor
36 short term memory
37 shutter button
38 wireless transceiver
39 switch
40 antenna
42 signal and quality strength detector
44 long term memory
46 power on step
48 shutter release inquiry step
50 capture and store image in short term memory step
52 start timer step
54 time out inquiry step
56 delay step
58 transfer remaining image from short term memory to long term memory step
60 image in memory inquiry step
62 delay step
64 signal strength and quality inquiry step
66 delay step
68 establish account step 70 signal strength and quality inquiry step
72 delay step
74 transmit next block in memory step
76 block remaining in memory step
78 delay step
80 interrupt step
82 stop transmission step
84 interrupt step
86 stop transmission step
88 transfer contents of short term memory to long term memory step

We claim:

1. A system for digital image capture and transmission, comprising:
   a) an image fulfillment server, having:
      i) a transceiver for sending a channel assessment signal and receiving a digital image file;
      ii) a memory for storing the received digital image file; and
   b) a digital camera having:
      i) an electronic image sensor for sensing an image and producing a digital image;
      ii) a short term memory for storing digital images produced by the image sensor in digital image files prior to transmission to the image fulfillment server;
      iii) a transceiver for communicating with and transmitting digital image files to the image fulfillment server;
      iv) a signal strength detector for monitoring the channel assessment signal from the fulfillment server and producing a transmit enable signal;
      v) a long term memory for storing the digital image files if they are not transmitted to the image fulfillment server within a predetermined time;
      vi) means responsive to the transmit enable signal for disabling transmission of the digital image data when the channel assessment signal indicates that successful transmission of the digital image data is not possible; and
      vii) timer means for transferring any image data remaining in the short term memory to the long term memory after the predetermined period of time.

2. The system for digital image capture and transmission claimed in claim 1, further comprising means for transferring any digital image data in short term memory to long term memory in response to turning off power to the camera.

3. The system for digital image capture and transmission claimed in claim 1, wherein the short term memory is a solid state memory and the long term memory is a magnetic disc drive.

4. The system for digital image capture and transmission claimed in claim 1, wherein the short term memory is a solid state memory and the long term memory is an optical disc drive.

5. A method for digital image capture and transmission, comprising the steps of:
   a) providing an image fulfillment server having a memory for storing the received digital image file and a transceiver for sending a channel assessment signal and receiving a digital image file;
   b) sending the channel assessment signal from the image fulfillment server;
   c) providing a digital camera having an electronic image sensor for sensing an image and producing a digital image, a short term memory for storing digital images produced by the image sensor in digital image files prior to transmission to the image fulfillment center, a transceiver for communicating with and transmitting digital image files to the image fulfillment server, a signal strength detector for monitoring the channel assessment signal from the fulfillment server and producing a transmit enable signal, and a long term memory for storing the digital image files if they have not been transmitted to the image fulfillment center within a predetermined time;
   d) disabling transmission of the digital image data when the channel assessment signal indicates that successful transmission of the digital image data is not possible; and
   e) transferring any image data remaining in the short term memory to the long term memory after the predetermined period of time.

6. The method for digital image capture and transmission claimed in claim 5, further comprising the step of transferring any digital image data in short term memory to long term memory in response to turning off power to the camera.

* * * * *